United States Patent [19]

Fengler

[11] 4,155,276

[45] May 22, 1979

[54] HIGH-RATIO SPEED-REDUCTION TRANSMISSION

[76] Inventor: Werner H. Fengler, 23651 Fordson Dr., Dearborn, Mich. 48124

[21] Appl. No.: 782,311

[22] Filed: Mar. 28, 1977

[51] Int. Cl.² ............................................. F16H 1/28
[52] U.S. Cl. ...................................... 74/804; 74/805
[58] Field of Search .................................. 74/804, 805

[56] References Cited

U.S. PATENT DOCUMENTS

| | | | |
|---|---|---|---|
| 1,282,172 | 10/1918 | Beirns | 74/804 |
| 1,942,795 | 1/1934 | Benson | 74/804 |
| 3,918,326 | 11/1975 | Kida et al. | 74/805 X |

Primary Examiner—Benjamin W. Wyche
Assistant Examiner—Frank H. McKenzie, Jr.
Attorney, Agent, or Firm—Willis Bugbee

[57] ABSTRACT

This two-stage speed reduction transmission has an input shaft which drives a first-stage fly-wheel rotating on a primary axis but having a rim annularly grooved eccentrically on a secondary axis to carry bearing balls engaging a correspondingly annularly-grooved internally-toothed ring gear which is also externally-toothed to mesh with stationary internal teeth in the housing, so that it can oscillate but not rotate. Meshing with this first-stage ring gear is a first-stage spur gear with a lesser number of teeth also rotatable upon the primary axis, the eccentricity between the primary and secondary axes being sufficient to permit clearance of the first-stage spur gear with the teeth of the first-stage internal ring gear on the side opposite its meshing location therewith. Drivingly connected to the first-stage spur gear to rotate on the primary axis is a second-stage flywheel also externally-grooved upon the secondary axis to receive bearing balls engaging a similar second-stage internal ring gear similarly meshing with and diametrically-oppositely clearing the teeth of a second-stage spur gear rotating on the primary axis and drivingly connected to an output shaft.

8 Claims, 3 Drawing Figures

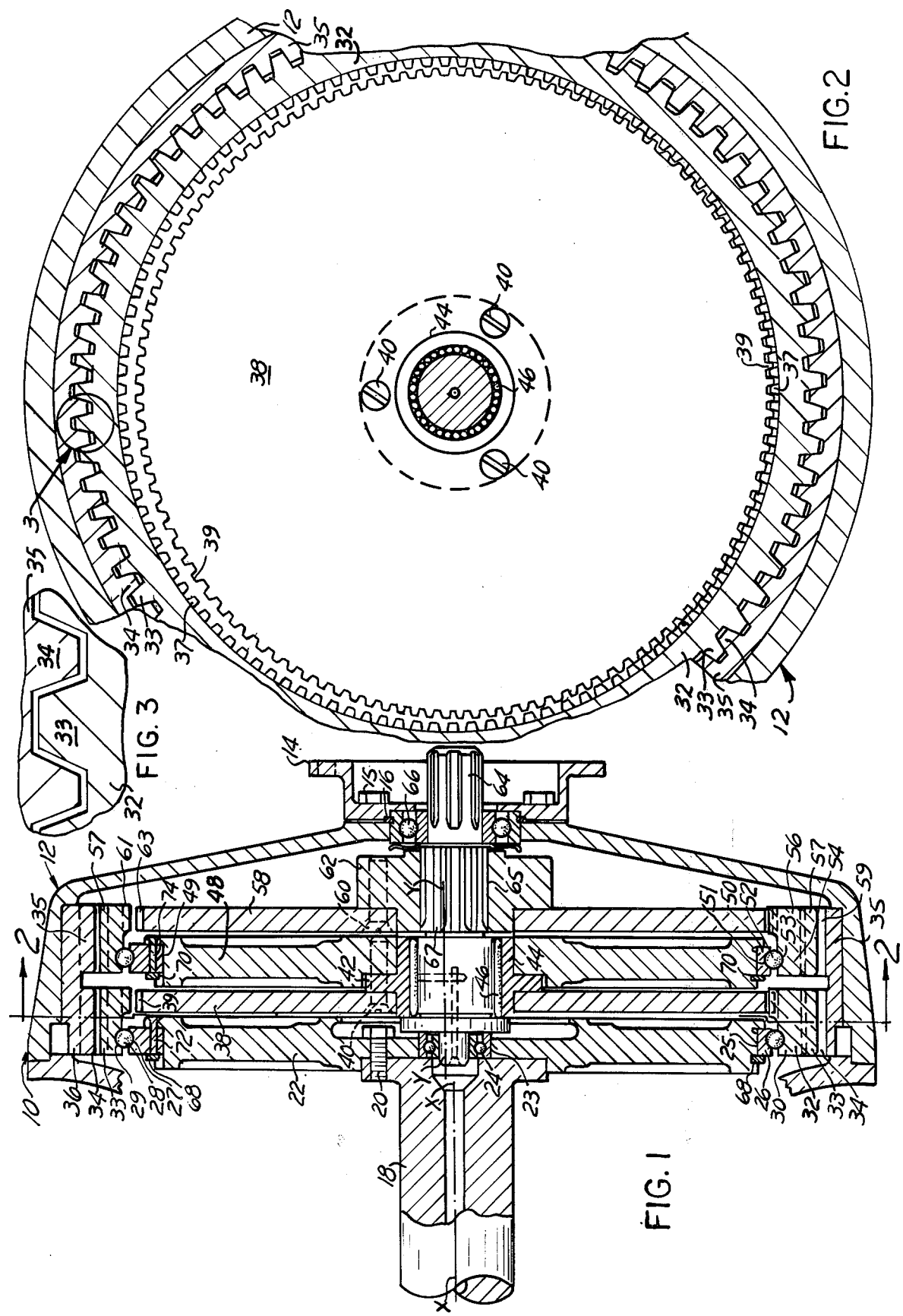

HIGH-RATIO SPEED-REDUCTION TRANSMISSION

BACKGROUND OF THE INVENTION

Turbines driven by expanding gases, such as steam or combustion gases have the disadvantage of requiring very high rotational speeds for their rotors and consequently requiring great reductions in speed to adapt them to use with other much slower moving mechanisms. In the past, exhaust turbines driven by exhaust gases from internal combustion engines in motor vehicles have found practical use mostly in directly supercharging the engines of such vehicles, especially in racing cars. Hitherto, in motor vehicles, the auxiliary units have been driven from the engine by belts and pulleys. Such auxiliary units include the generator alternator, the cooling fan, the oil pump for power steering, the refrigerant compressor for air conditioning, the air compressor or power brakes of trucks and trailers and the oil pump for levelling the chassis frame in cranes and earth moving equipment. Recent investigations have shown that a great amount of power is consumed in driving these auxiliary units, thereby expending much fuel. The present invention seeks to avoid such wastage by utilizing the exhaust gases of the engine to drive a gas turbine, the extremely high output speed of which is reduced by means of the present speed-reduction transmission so that the output of the latter is sufficiently low to drive these auxiliary units and at the same time utilize the propulsive power of the exhaust gases which would otherwise be wasted. Sufficient standby electrical power is contained in the vehicle storage battery while the vehicle is halted at stop lights and other points of delay, while sufficient additional compressed air for operating the brakes during such standby periods is easily supplied by providing additional compressed air tank capacity.

The high ratio speed reduction transmission of the present invention also has the advantage over the conventional worm gear and worm wheel speed reduction transmission wherein the axes of the worm wheel shaft are necessarily perpendicular to one another, hence require a bulky casing and excessive space to accommodate such a casing. The present transmission has its input and output shafts almost coaxial with one another, hence is much more compact and requires much less space to accommodate it.

SUMMARY OF THE INVENTION

The invention primarily resides in the provision of an input shaft driving a flywheel rotating on a primary axis but having a rim annularly grooved eccentrically on a secondary axis at a bearing race for bearing balls engaging a correspondingly-annular grooved internally-toothed ring gear which is externally-toothed to mesh with stationary internal teeth in the housing so that it can oscillate but not rotate. Meshing with this ring gear is an output spur gear with a lesser number of teeth rotatable upon the primary axis, the eccentricity between the primary and secondary axes permitting clearance between the internal ring gear and the output spur gear.

In the drawing,

FIG. 1 is a central vertical longitudinal section through a high ratio speed reduction transmission, according to one form of the invention, FIG. 2 is a fragmentary vertical cross-section taken along the line 2—2 in FIG. 1; and FIG. 3 is an enlargement of the cross-sectional area within the circle designated by the arrow and numeral 3 in FIG. 2, to indicate the minute clearances between the gear teeth in the upper part of FIG. 2 to allow for oscillation of the inner portion teeth relatively to the outer portion teeth in the upper part of FIG. 2, while meshing in the lower part of FIG. 2.

Referring to the drawing in detail, the high-ratio speed reduction transmission, generally designated 10, is a two-stage transmission, yet occupies less space than a single worm-gear speed reduction transmission of the same reduction ratio. The second stage, however, is similar in construction to the first stage and multiples the speed reduction ratio of the first stage.

The transmission 10 is contained in a housing 12 (FIG. 1) having a retaining cap 14 bolted thereto at 15 with a bearing race retaining ring 16 therebetween. The power input shaft 18 at the left-hand is drivingly connected to the engine flywheel shaft (not shown) and rotates on the first axis X—X thereof. The power input shaft 18 is bolted at 20 to the first stage flywheel 22, the center of which is bored at 23 coaxially with the input shaft 18 to receive a first shaft ball bearing unit 24. The rim of the flywheel 22 is machined with a first annular rabbet 25 centered on the first axis X—X to carry an annular first inner ball race 26 with an annular first excentric ball groove 27 centered on the eccentric second axis Y—Y to receive bearing balls 28 which engage the correspondingly-excentric ball groove 29 of an annular outer ball race 30. The latter also carries an internally- and externally-toothed first stage ring gear 32 which can oscillate but not rotate by its external teeth 33 meshing with the internal teeth on one side of the annular casing 35 and centered on the first axis X—X, while providing sufficient clearance between said teeth 33 and 34 on the opposite side of said casing 35 to permit said oscillation of the ring gear 32, as shown enlarged in FIG. 3. The casing 35 is mounted inside the housing 12 (FIG. 2) and prevented from rotating by shear pins 36. Meshing with the internal teeth 37 of the first stage ring gear 32 are the external teeth 39 of a first stage driven spur gear 38 which is bolted at 40 to the flange 42 of a hub 44 which is rotatably mounted on needle bearings 46, all these being coaxial with the first axis X—X. The eccentricity of axes X—X and Y—Y is sufficient to permit clearance of the external teeth 39 of the spur gear 38 with the internal teeth 37 of the internal ring gear 32 on one side while in mesh with one another on the diametrically opposite side (FIG. 2).

Also bolted at 40 to the hub flange 42 is a second stage flywheel 48, the rim of which is machined with a second annular rabbet 49 centered on the first axis X—X to receive a second inner ball race 50 grooved with an annular second excentric ball groove 51 eccentrically on the second axis Y—Y and carrying bearing balls 52. These engage the excentric ball groove 53 of a second outer ball race 54, the ball groove 53 being centered on the second axis Y—Y. The second outer ball race 54 forms a part of a second stage ring gear 56 like the first stage ring gear 32 and has external teeth 57 similarly meshing with internal teeth 59 of the casing 35 and centered on the second axis Y—Y. The second stage ring gear 56 has internal teeth 61 meshing with the external teeth 63 of a centrally-mounted second stage spur gear 58 likewise rotating on the first axis X—X. The second stage spur gear 58 is bolted at 60 to the internally splined output hub 62 which has an internally-splined driving connection 65 with the externally splined portion 67 of the power output shaft 64 from which a power takeoff is obtained at a greatly reduced speed. A second shaft ball bearing unit 66 rotatably supports the power output shaft 64. Shear pins 68 and 70 prevent the fly wheel ball races 26 and 50 from sliding circumferentially to their respective flywheels 22 and 48. The ring gears 32 and 56 have two teeth more than their respective spur gears 38 and 58, and this difference creates the speed reduction.

In operation, the rotation by the engine (not shown) of the power input shaft 18 causes oscillation in an orbital path but not rotation of the first stage spur gear 38 by two teeth. The first stage spur gear 38, however, remains in mesh with the oscillating but not rotating ring gear 32 oscillates inside it in an orbital path because of the relative eccentricity of the two gears 38 and 32. The greatly reduced rotation thus imparted by the oscillating first stage ring gear 32 to the first stage spur gear 38 is transmitted through the hub flange 42 to the second stage flywheel 48 which thus very slowly oscillates the second stage ring gear 56 to impart a further very great speed reduction of two teeth per revolution to the second stage spur gear 58. In other words, each spur gear 38 or 58 advances only two teeth per oscillation of its respective ring gear 32 or 56. As a result, there is obtained a tremendous speed reduction between the power input shaft 18 and the power output shaft 64 splined to the hub 62 carrying the second stage spur gear 58.

The flywheel 22 is dynamically balanced with the ball bearing race 25, including the balls 28 and the ring gear 32 assembled to minimize the centrifugal forces of the excentrically orbiting but not rotating ring gear 32 through removing stock of the flywheel 22 opposite the axis Y—Y. Similarly, the flywheel 48 is dynamically balanced with the ball bearing race 50 and the ring gear 56 assembled to minimize the centrifugal forces of the excentrically orbiting but not rotating ring gear 56 through removing stock of the flywheel 48 opposite the axis Y—Y.

I claim:

1. A high ratio speed reduction transmission, comprising
   a hollow stationary housing structure having a stationary inner wall portion,
   a rotary power input member journaled in said housing structure for rotation relatively thereto upon a first axis of rotation,
   a rotary power output member journaled in said housing structure for rotation relatively thereto upon said first axis of rotation,
   a first rotary flywheel drivingly connected to said rotary power input member coaxial with said first axis of rotation and having thereon a first annular bearing portion centered upon a second axis of rotation disposed in radially-spaced parallel relationship to said first axis of rotation,
   a first substantially rigid ring gear journaled on said first annular bearing portion for oscillation relatively thereto,
   a first means connecting said first ring gear to said inner wall portion of said housing for preventing rotation of said first ring gear while permitting oscillation thereof in response to rotation of first flywheel,
   said first ring gear having a first set of internal gear teeth thereon centered upon said second axis of rotation,
   a first substantially rigid externally-toothed gear journaled in said housing structure within said first ring gear for rotation upon said first axis of rotation and having a first set of annular external peripheral gear teeth of smaller diameter than said first set of internal ring gear teeth and disposed in meshing engagement therewith on one side only of said gears and clearing one another on the diametrically opposite side thereof,
   and mechanism drivingly connecting said first externally-toothed gear to said rotary power output member.

2. A high-ratio speed reduction transmission, according to claim 1, wherein said first means comprises a first recess in said inner wall portion and an external tooth on said first ring gear rockingly and slidingly engaging said first recess.

3. A high-ratio speed reduction transmission, according to claim 1, wherein said first means comprises a first arcuate array of internal gear teeth on said inner wall portion and a first arcuate array of external gear teeth on said first ring gear disposed in meshing engagement with said first arcuate array of internal gear teeth on said inner wall portion.

4. A high-ratio speed reduction transmission, according to claim 1, wherein said first annular bearing portion comprises a first annular antifriction bearing assembly encircling said first flywheel and containing rolling bearing elements engaging said first ring gear.

5. A high-ratio speed reduction transmission, according to claim 1. wherein said mechanism comprises a second rotary flywheel drivingly connected to said first externally-toothed gear coaxial with said first axis of rotation and having thereon a second annular bearing portion centered upon said second axis of rotation, a second ring gear journaled on said second annular bearing portion for oscillation relatively thereto, a second means connecting said ring gear to said inner wall portion of said housing structure for preventing rotation of said second ring gear while permitting oscillation thereof in response to rotation of said second flywheel, said second ring gear having a second set of internal gear teeth thereon centered upon said second substantially rigid axis of rotation, and a second externally-toothed gear journaled in said housing structure within said second ring gear for rotation upon said first axis of rotation and having a second set of annular external peripheral gear teeth and disposed in meshing engagement therewith, said second externally-toothed gear being drivingly connected to said rotary power output member.

6. A high-ratio speed reduction transmission, according to claim 5, wherein said second means comprises a second recess in said inner wall portion and a second external tooth on said second ring gear rockingly and slidingly engaging said second recess.

7. A high-ratio speed reduction transmission, according to claim 5, wherein said second means comprises a second arcuate array of internal gear teeth on said inner wall portion and a second array of external gear teeth on said second ring gear disposed in meshing engagement with said second array of internal gear teeth.

8. A high-ratio speed reduction transmission, according to claim 5, wherein said second annular bearing portion comprises a second annular anti-friction bearing assembly encircling said second flywheel and containing rolling bearing elements engaging said second ring gear.

* * * * *